(12) United States Patent
Zukunft et al.

(10) Patent No.: US 8,320,435 B2
(45) Date of Patent: Nov. 27, 2012

(54) LOW POWER STATE FOR DSL SYSTEM AND DEVICES

(75) Inventors: Roland Zukunft, Munich (DE); Rudi Frenzel, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 597 days.

(21) Appl. No.: 11/863,289

(22) Filed: Sep. 28, 2007

(65) Prior Publication Data

US 2009/0086798 A1    Apr. 2, 2009

(51) Int. Cl.
   *H04B 1/38* (2006.01)
(52) U.S. Cl. ........................ 375/222; 375/295
(58) Field of Classification Search .................. 375/222, 375/295
   See application file for complete search history.

(56) References Cited

U.S. PATENT DOCUMENTS

| | | | |
|---|---|---|---|
| 7,486,608 B1 * | 2/2009 | Long et al. | 370/207 |
| 2004/0057528 A1 * | 3/2004 | Tzannes | 375/260 |
| 2005/0213405 A1 * | 9/2005 | Stopler | 365/203 |
| 2005/0220202 A1 * | 10/2005 | Tzannes | 375/260 |
| 2005/0254515 A1 | 11/2005 | Suzuki et al. | |
| 2006/0039457 A1 * | 2/2006 | Davis et al. | 375/222 |
| 2006/0233273 A1 * | 10/2006 | Greszczuk et al. | 375/260 |
| 2006/0291408 A1 * | 12/2006 | Huang et al. | 370/311 |
| 2008/0176548 A1 * | 7/2008 | Liang | 455/419 |

OTHER PUBLICATIONS

European Commission directorate-general RC joint research centre, Institute for the Environment and ustainability, Renewable Energies Unit, Code of Conduct on Energy Consumption of Broadband Equipment Ispra, Jul. 19, 2006, 11 pages.

* cited by examiner

*Primary Examiner* — Curtis Odom
(74) *Attorney, Agent, or Firm* — SpryIP, LLC

(57) ABSTRACT

Described herein are systems, apparatuses, and methods relating to a power-saving state or power-saving mode to facilitate clock synchronization between the two transceiver units and/or updating of DSL operation parameters during the power-saving state.

18 Claims, 7 Drawing Sheets

LOW POWER STATE FOR DSL SYSTEM AND DEVICES

BACKGROUND

Digital subscriber line (DSL) systems are becoming increasingly popular for providing a user broadband access to locally or globally interconnected networks such as the internet. A DSL connection is using subscriber lines which are typically provided by twisted pair copper to establish a bidirectional electrical transmission between a transceiver unit located at a provider's site of a subscriber line and a transceiver unit located at the subscriber's site In order to establish a data transfer, both transceiver units at the end of the subscriber lines have to perform a predefined initialization sequence. During the initialization, channel parameters are analyzed and information such as profiles, settings and control parameters etc is exchanged or determined. Training sequences for training operation parameters such as FEXT (far-end cross talk) coupling coefficients, NEXT coefficients (near-end cross talk) coupling and echo cancellation coefficients may be also executed during initialization.

After initialization, the transceiver units are entering showtime operation mode where user data is transferred between the two transceiver units. Both of the transceiver units are maintained activated in order to perform transmission and receiving of data.

After finishing a session, the transceiver unit may be shut down until another session starts. For the next session, both transceiver units have to undergo again the time-consuming initialization procedure as described above.

For some applications, such as for example VoIP (voice over IP), data connection between the transceiver units has to be established in short times since users are expecting to receive incoming telephone calls with no or only short time delays.

If both transceiver units are maintained all time activated for data transmission ("always-on") in order to allow instant data connections, they have to be operated with full-power which increases the overall energy consumption of the system significantly. Furthermore, the "always-on" operation may cause heat problems for example in small cabinets and may decrease the lifetime of system components.

In some DSL standards such as ADSL 2 according to ITU-T/G.992.3 and ADSL 2 plus according to ITU-T/G.992.5 power saving states have been introduced in order to address the above problem. Different power management states L0, L2 and L3 are provided, wherein L0 is a full-power mode as used in showtime data transmission, L2 is a power saving mode wherein data transmission is provided with lower power spectral density and therefore reduced data transmission rate and L3 is a power saving state wherein the transmitter applies zero voltage to the subscriber line and the transceiver units are basically allowed to enter a sleep mode. L2 power management state may be entered and exited based on the current data transmission rate. For example, when the user loads large data files from the internet, the transceiver unit may be maintained in the L0 power management state while when the data transmission rate is lowered, for example when the user is busy with other activities such as writing messages or reading documents on the computer, the transceiver unit enters the L2 power management state. While in L2, the DSL system can instantaneously enter the L0 state allowing for full-rate data transmission. The L2/L0 entry/exit is achieved without any service interruption and is basically not noticeably for a user.

The L3 power management state can be considered as a sleep mode wherein no user data is transmitted between the two transceiver units. Nevertheless, when the user decides to again establish a data connection or when a VoIP call is incoming at a transceiver unit, an initialization or re-initialization is necessary for providing the data connection. Typically, the initialization procedure requires about 10 to 30 seconds.

In order to reduce the initialization time period, the ADSL 2 plus standard describes a short initialization procedure allowing an initialization of about 3 seconds from L3 to L0 which may be depending on the implementation also longer. However, for applications such as triple play applications like VoIP or video over IP, data transmission has to be established in time periods as short as 1 second or less. Existing DSL systems are not able to establish such short transitions.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

In the following, exemplary embodiments related to a new power-saving state or power-saving mode are explained allowing to maintain clock synchronization between the two transceiver units and/or updating of DSL operation parameters during the power-saving state. The power-saving state may be a sleep state or sleep mode wherein no data are transferred or a power-saving state with reduced transmission rate. With the power-saving state, transitions to a full-power operating state or to other power-saving states such as the L2 state can be achieved in short time periods and data communication with a performance obtained before switching to the power-saving mode can be achieved more easily. These transitions can also be referred as warm-start or warm-start transitions. Furthermore, as will be explained in more detailed below, the power-saving state allows monitoring and adaptation for changes of parameters of the data communication link and other DSL operation parameters while the transceiver units are set in the power-saving state. Adaptation to the changes may not only allow an improved data communication of the communication channel after switching back to the full-power data transmission mode but also allows to reduce influences such as cross coupling of the communication link to other subscriber lines (communication channels) of the system.

Figure 1:
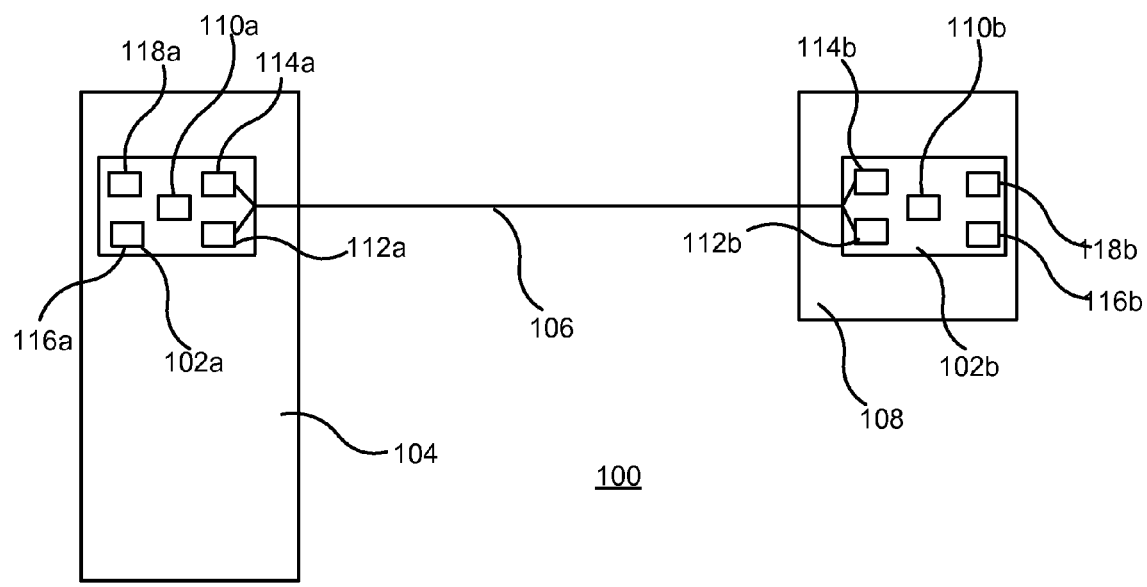
FIG. 1 shows a block diagram according to an embodiment of the present invention.

Referring now to FIG. 1 an exemplary DSL system 100 implementing the power-saving state is shown. As is known to a person skilled in the art, the DSL system 100 may be a DMT (discrete multitone) system wherein data are modulated on a plurality of subcarriers such that each subcarrier is associated with one carrier frequency. The DSL system comprises a first transceiver unit 102a provided at the operators site in an unit 104 such as a central office, a cabinet or other optical network termination units. The first transceiver unit 102a is coupled to a second transceiver unit 102b via a subscriber line 106. The second transceiver unit 102b is integrated in a unit 108 at the subscriber site for example a costumer premise equipment (CPE) such as a modem, router or any other gateway which may also be integrated in other devices such as a personal computer or notebook.

The first transceiver unit 102a includes a first transmitter 112a and a first receiver 114a coupled to the subscriber line 106. The second transceiver unit 102b includes a second transmitter 112b and a second receiver 114b coupled to the subscriber line 106. For coupling of the transmitters and receivers each of the transceiver units may comprise a coupling interface such as hybrid networks etc.

A first controller 110a is provided to set the transceiver unit 102a in the power-saving mode. Furthermore, a second controller 110b is provided at the subscriber site to set the transceiver unit 102b in the power-saving mode. Operation of the controllers will be described in more detail below.

While FIG. 1 shows the controllers 110a and 110b integrated with a respective one of transceiver units 102a and 102b, it is to be understood that the controllers 110a and 110b may be provided separate from the respective transceiver unit. It is further to be understood that the first and second controllers 110a and 110b may be implemented in hardware, software, firmware or any combinations thereof.

Each of the transceiver units may further comprise a clock generator indicated in FIG. 1 with reference numbers 116a and 116b to generate clock signals for the respective transceiver units. One of the clock generators, for example clock generator 116a at the operator's site, is a master clock signal for the slave clock at the respective other transceiver unit. To synchronize the master clock with the slave clock, clock synchronization signals based on the master clock are transmitted over subscriber line 106. Clock synchronization signals may be transmitted as one or more pilot tones. Pilot tones may be unmodulated subcarriers of the plurality of subcarriers used by the DSL system which results in periodic signals. In other embodiments, pilot tones may be non-periodic signals resulting from a modulation of data on the pilot tone frequency during showtime. Furthermore, according to one embodiments, pilot tones may be periodic signals transmitted at predetermined time instances. As will be described below in more detail, according to embodiments, synchronization signals may be transmitted only in predetermined time intervals during the power-saving state.

Furthermore, according to embodiments, test signals for determining information used for updating DSL operation parameters may be transmitted by one of the transceiver units while being in a power-saving state. The DSL operation parameters may include operation parameters of the transceiver units or may include parameters related to transmission or connection parameters. For example the test signals may be test signals for updating Next and Fext parameters. Next and Fext parameters are to be understood as any parameters which are derived from or related to Next and Fext.

The test signals may be measured at the transceiver unit transmitting the test signal or may be measured at the transceiver unit receiving the test signal to obtain the information for updating DSL parameters. The measurement results may be transmitted to the respective other transceiver unit by using dedicated messages for transmitting the measurement information. The parameters may then be determined at the respective other transceiver unit based on the transmitted measurement result. Furthermore, the information for updating DSL parameters may be determined at the respective receiver based on the measurement. In this case the updating parameter determined is exchanged between both transceiver units during the power-saving state by using dedicated messages for transmitting the updating parameters. Exchanging of messages may for example be used when the updating information is required at both sites. The messages may be transmitted between the two transceiver units by using transmission with reduced transmission rate during the power-saving state.

The updating during the power-saving mode allows reducing the transition time from the power-saving state to the regular transmission state since the system can rely on the updated parameters and may not need to determine the parameters or can shorten training time upon transferring to the full-power state. For example, in Vector transmission systems such as VDLS2, FEXT coupling coefficients or parameters related to the FEXT coupling coefficients allows compensation or precompensation of the FEXT disturbance. The (pre)compensation of FEXT is also known as level 3 DSM. By updating these and other parameters upon each respective test signal, an adjusting of the data transmission can be provided during the power-saving state which allows to take changes of the environment into account, for example a newly operated line, such that upon transition to the normal (full-power) operation state, influences due to the changed environment are reduced or eliminated.

The DSL operation parameters which are updated during the power-saving state may include parameters which are adapted also during full-power operation of the DSL transceivers such as NEXT coefficients, FEXT coefficients, echo cancellation parameters, equalizer settings or parameters which are not adapted during full-power operation but are adapted or changed during power-saving states in view of changes in the environment. Such parameter may include for example a bit-loading table of subcarriers used in the regular data transmission, a power spectrum density mask, an interleaver depth, a gain parameter, a DSM (dynamic spectrum management) level 2 parameter, a tone ordering parameter etc. A gain parameter is the power used for transmitting on each respective subcarrier. A tone ordering parameter is a parameter used for indicating the ordering of the subcarriers. Tone ordering parameters may for example be the tone ordering tables t which are defined as the sequence in which the subcarriers are assigned to bits from the input bit stream (i.e. ti for i=1 to NSC-1, with constellation mapping beginning on subcarrier t1 and ending on tNSC-1). The tone ordering table is for example updated when the bit allocation changes the subcarriers assigned for modulating one bit. DSM level 2 parameters are related to the optimization of the transmission power for the plurality of transceivers associated with the plurality of wires in a cable bundle to minimize crosstalk. DSM level 2 parameters may for example be parameters related to a SNR (signal to noise ratio) per subcarrier which is typically transmitted from the transceiver unit 102b (CPE) to the transceiver unit 102a (CO) such as a spectral power density.

The DSL operation parameters updated may include operation parameters of the transceiver units or parameters related to the DSL connection. The parameters related to the DSL connection may include parameters of the connections which are used during the power-saving state or parameters which are not used during the power-saving state but are used during the normal operation state.

To allow updating of the DSL operation parameters, each controller of the transceiver units 102a and 102b may control a respective transmitter to transmit the test signals during the power-saving state via the subscriber line to a receiver at the respective other site. According to embodiments, the test signals may be transmitted in the power-saving state during predetermined time intervals which are known to both controllers of the transceiver units. In other embodiments, the test signal may be transmitted in the power-saving state during time intervals which are not known to the receiver prior to the receiving of the test signals. Identification of the first and second time intervals may be based on predetermined time schedule information or based on test signal identifications or predetermined signal sequences such as preambles which may be transmitted prior and/or after the test signals to identify the respective beginning and end of the test signals.

Measurement entities 118a and 118b coupled to a respective receiver of the transceiver units may be provided to measure the test signals. The test signals may include test signals intended to be measured at the receiver of the respective other transceiver unit such as FEXT test signals or may include test signals which are to be measured at the receiver of the transceiver unit which transmitted the test signal such as signals for testing echo cancellation parameters. Each of the controllers may be capable to identify test signals which are to be ignored when the test signals are intended for a measurement at the respective other site. Furthermore, each of the controllers may be capable to identify the time periods during which test signals are transmitted over the subscriber lines. Identification may be based on predetermined time schedule information transferred between the two transceiver units or based on test signal identifications or predetermined signal sequences such as preambles which may be transmitted prior and after the test signals to identify the respective beginning or end of the test signals.

After measuring the received test signals, the measurement entities provide updating information based on the received test signals. The measurement entities may be coupled to the respective transmitter to transmit the updating information over the subscriber line to the opposite transceiver unit in order to effect updating of respective parameters.

Figure 2:
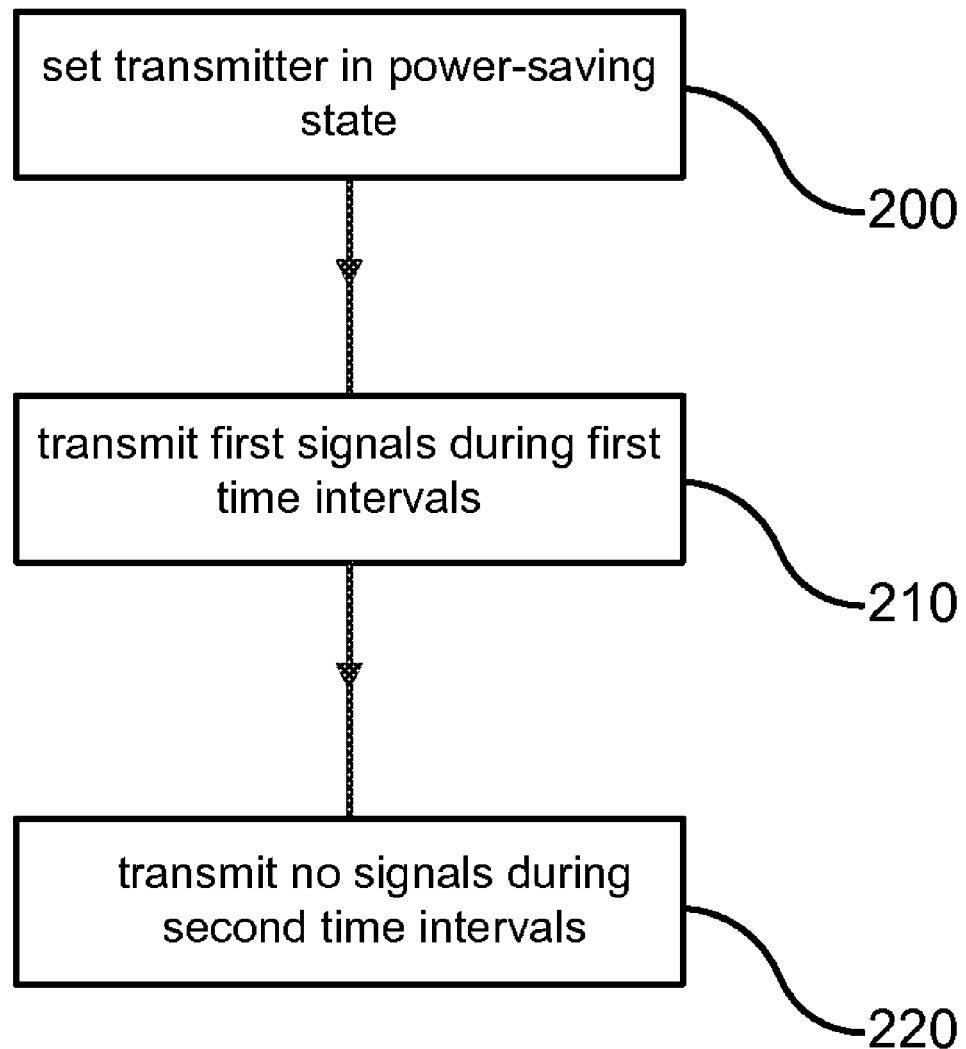
FIG. 2 shows a flow chart diagram according to an embodiment of the present invention.

Referring now to FIG. 2, an exemplary operation will be described. The operation is described with respect to one of the transceiver units which may be transceiver unit 102a or 102b. It is however to be understood that also both of the transceiver units 102a and 102b may be concurrently set and operated in a power-saving state.

At 200, a transmitter of the transceiver unit is set into a power-saving state. The transmitter may for example be set into the power-saving state when the communication link over the subscriber line is terminated after for example a VoIP call is completed, internet access is terminated by the user or data transfer is reduced below a predetermined threshold. The power saving state may be a state wherein no user data is transmitted over the subscriber line such as in a L3 state or a state wherein user data is transmitted with reduced data rate such as a L2 state.

Reduced data rate may be provided by transmitting the signals in the power-saving state with reduced spectral transmission power density (power per frequency) compared to the regular data transmission state. The spectral transmission power density may be reduced by a power cutback such that the spectral distribution in frequency is not changed. Furthermore, according to another embodiment, the frequency distribution of spectral transmission power density is changed when switching to the power-saving state compared with the spectral transmission power density used during full-power data transmission. The spectral transmission power density used during the power-saving state may be exchanged between the two transceiver units prior to setting one or both of the transceiver units in the power-saving state.

First signals are transmitted during the first time intervals from the transmitter to a receiver, see 210. The first signals may be clock synchronization signals to synchronize a slave clock of the respective other transceiver unit or test signals for updating DSL operation parameters as described above. The first time intervals may be periodic in time or non-periodic in time.

During the second time intervals, no signals are applied to the subscriber line 206, see 220. Thus, during the second time intervals, the transmitter applies a zero output voltage on the subscriber line 206. The transmitter may reduce in these time intervals its power consumption compared to the power consumption during the first time intervals by reducing power or shutting down one or more components of the transmitter path. According to one embodiment, the second time intervals correspond to L3 states as defined in the ITU-T G.992.3 and G.992.5. During the second time intervals, one or more components of the transmitter or computing blocks at higher OSI-levels may have reduced power consumption or may be completely shut down. Examples of components which may have reduced power or shut down are digital-to-analog converters (DACs), symbol encoders, IFFT (inverse fast fourier transformation) computing blocks etc.

Furthermore, according to embodiments, the power consumed by the transmitter during the first time intervals may be reduced compared to a power consumed by the transmitter during a full-power state such as L0. According to one embodiment, transmitter components or computing blocks may be shut down or supplied with reduced power also during the first time intervals.

According to one embodiment, operational and maintenance messages (OAM messages) may be transmitted during the power-saving state by each of the transceiver units 102a and 102b. OAM information transmitted in the OAM messages may include DSM (dynamic spectrum management) signaling information or QLN (quiet line noise) or SNR (signal to noise) information. The OAM messages may be transmitted in special dedicated channels with reduced data rate and may be provided only during the power-saving state.

The power-saving state may according to embodiments be finished or exited upon request from each of the transceiver units. A request may for example be transmitted if user data such as VoIP data or other data are to be transmitted by one of the transceiver units. To initiate a transition (warm start), a sequence of DMT training signals or other signals may be used after which the data transmission in the regular data transmission state may start.

According to embodiments, each of the receivers of the transceiver units 102a and 102b is capable to distinguish between a plurality of signals which may be transmitted during the power-saving state. These signals may include signals (G.hs signals) sent by one transceiver unit to the opposite transceiver unit to request or indicate a regular or full initialisation, signals (C-COMB/R-COMB) wherein the opposite transceiver unit requests a short initialization as described in the background section, signals (C-WARM/R-WARM) wherein a warm-start is requested by one of the transceiver units, signals (C-TEST/R-TEST) indicating to a respective transceiver unit that the opposite transceiver unit will transmit test signals and signals (C-OAM/R-OAM) indicating that the opposite transceiver unit is sending OAM commands in the power-saving state.

Exemplary embodiments of operations will now be described in the following with reference to FIGS. 3a-3c and FIGS. 4a and 4b.

Figure 3A:
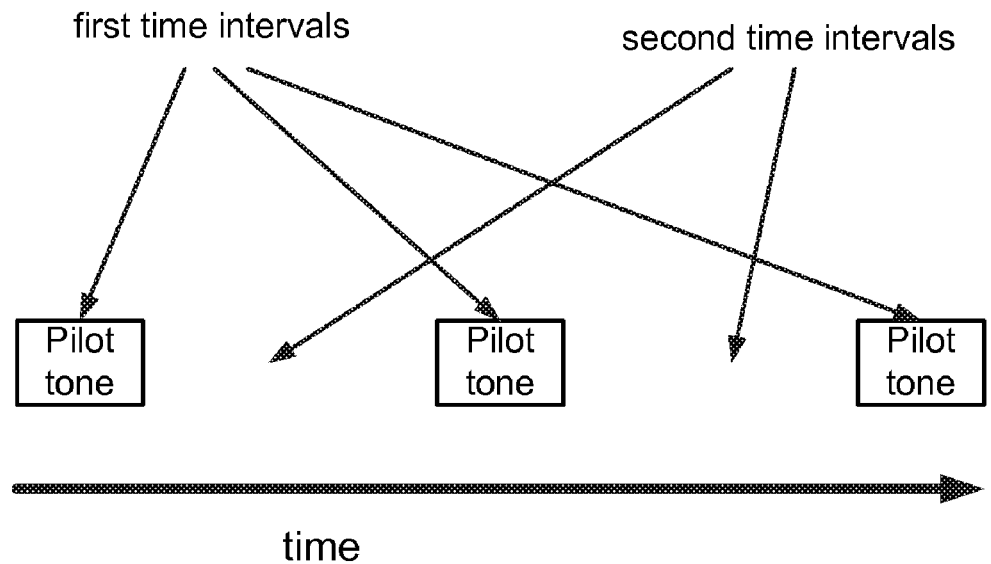
FIGS. 3a to 3c show time sequence diagrams according to an embodiment of the present invention.

FIG. 3a shows a time sequence according to one operation, wherein a clock synchronization signal is transmitted by intermittently transmitting one or more pilot tones. During the second time intervals, i.e. between successive first time intervals, zero voltage is applied to the subscriber line. As outlined above, the pilot tones during the first time intervals may be transmitted on one or more frequencies depending on requirements and implementations. According to one embodiment, the frequency of a pilot tone during the power-saving mode may be different from a frequency of the pilot tone used during normal (full-power) operation. Since no data transmission or data transmission with reduced rate is provided during the power saving mode, the pilot tone may be transmitted with lower power compared to the transmission of a pilot tone during normal data transmission operation. The first and second time intervals may be depending on the time recovery implemented at the transceiver unit of the receiver site. In specific, the second time intervals may be selected such that the slave clock is not completely loosing the timing to the synchronization signal and is able to adapt again to the synchronization signal after each second time interval. During the first time intervals, the slave clock may then be able to again track the synchronization signal and readjust the slave clock to the synchronization signal. To give an example, the second time intervals may be selected according one embodiment to be greater than 100 ms and up to 0.5 sec or more while the first time intervals can be selected to be less or much less than the second time intervals. The first and the second time intervals may be predetermined or pre-known time intervals which may be exchanged for example during initialization of the DSL data connection.

Figure 3B:
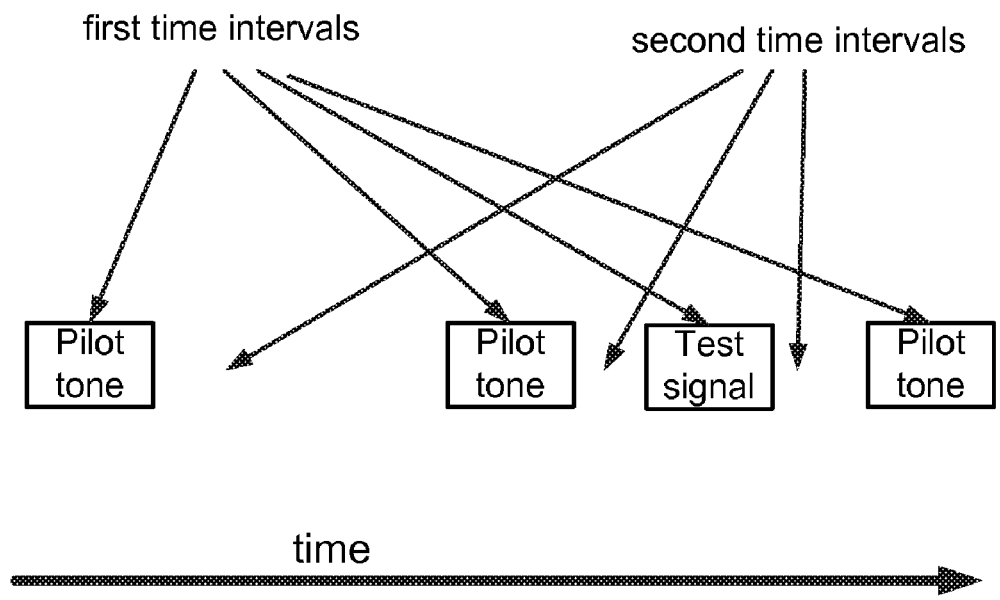

FIG. 3b shows a time sequence according to one operation wherein test signals are transmitted in addition to the intermittently transmitting of the pilot tones. In this operation, the pilot tones and the test signals are provided in non-overlapping first time intervals. The test signals may be used for updating coefficients related to DSL operations of the transceiver units or line characteristics as outlined above. During the second time intervals, i.e. in time intervals when neither a test signal nor a pilot tone is transmitted, zero voltage is applied to the subscriber line.

Figure 3C:
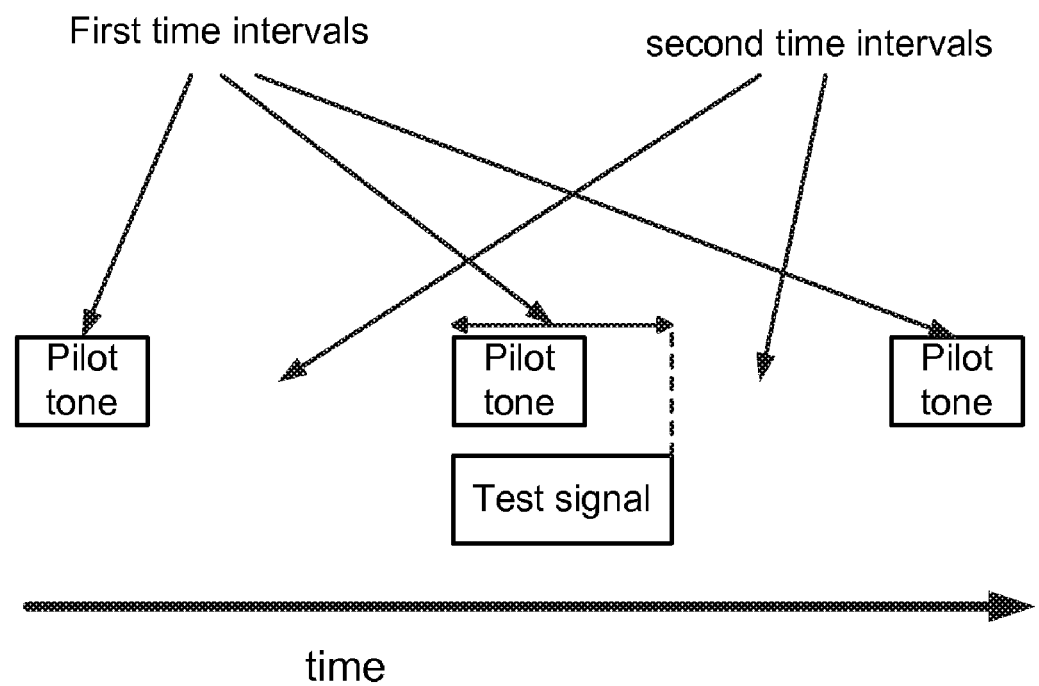

FIG. 3c shows a time sequence according to one operation, wherein pilot tones and test signals are transmitted in overlapping time intervals. The test signals may be transmitted in predetermined time intervals which are known to both, the transmitter or receiver or may be transmitted based on the control by the transmitting transceiver unit such that the receiver is not aware in advance of the time intervals during which the test signals are transmitted. To detect the test signals at the receiver, predetermined signal sequence or other identifications may be used.

While in the operations according to FIGS. 3a-3c no signals have been applied to the subscriber line 106, operations will be explained with respect to FIGS. 4a and 4b wherein signals such as a clock signal or user data transmission signals are allowed to be transmitted continuously during the power-saving state.

Figure 4A:
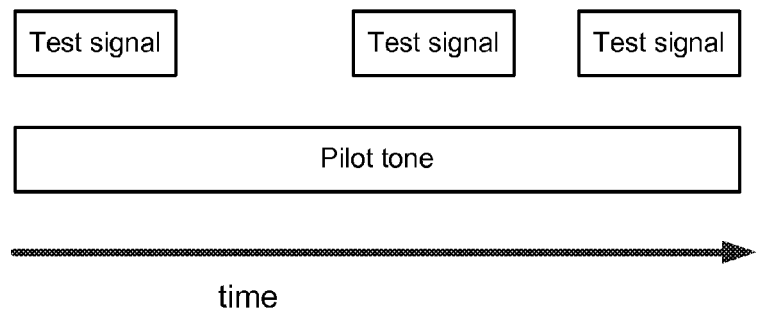
FIGS. 4a and 4b show time sequence diagrams according to an embodiment of the present invention.

FIG. 4a shows one operation wherein the pilot tone is transmitted continuously while the transceiver unit is in a power-saving state. As shown in FIG. 4a, test signals are provided during the power-saving mode in order to track and update parameters as outlined before.

Figure 4B:
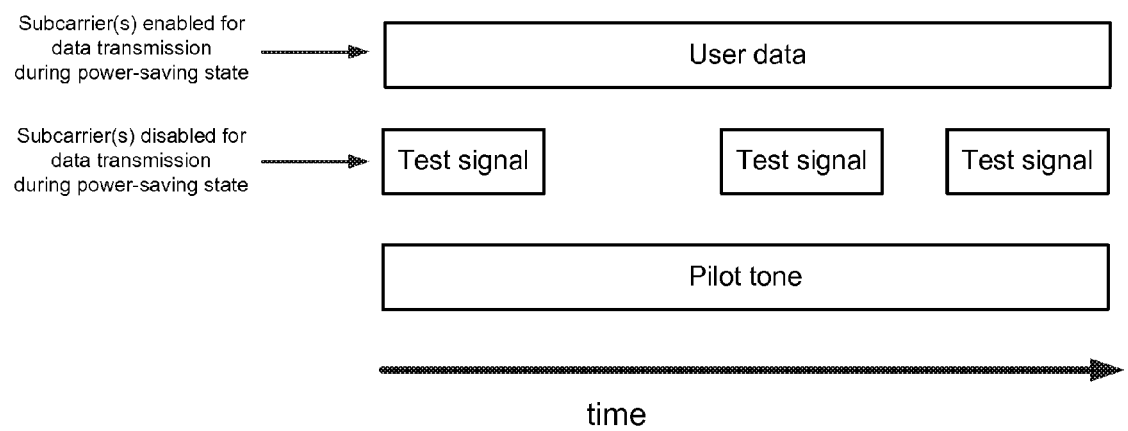

FIG. 4b shows one operation wherein upon setting the DSL transmitter in a power-saving state, at least one subcarrier of a plurality of subcarriers for DSL transmission is deactivated or disabled for transmission of user data over a subscriber line. According to this operation, one or more test signals are transmitted during the power-saving state over the subscriber line for updating DSL operation parameter related to the at least one deactivated subcarrier. As can be seen in FIG. 4b, test signals are transmitted by modulating the test signals on the one or more deactivated subcarriers and transmitted to the receiver at the other site. In this operation, one or more pilot tone may be transmitted continuously as shown in FIG. 4b or may be transmitted intermittently as described previously. It is to be noted that the operation shown in FIG. 4b is similar to a L2 operation with the additional transmission of test signals as described above.

Furthermore, according to one embodiment all subcarriers for DSL transmission may be deactivated in the power-saving mode for transmission of user data while test signals are sent for updating parameters related to at least one of the subcarriers. One exemplary operation of this embodiment includes a L3 state with the additional transmission of test signals.

Figure 5A:
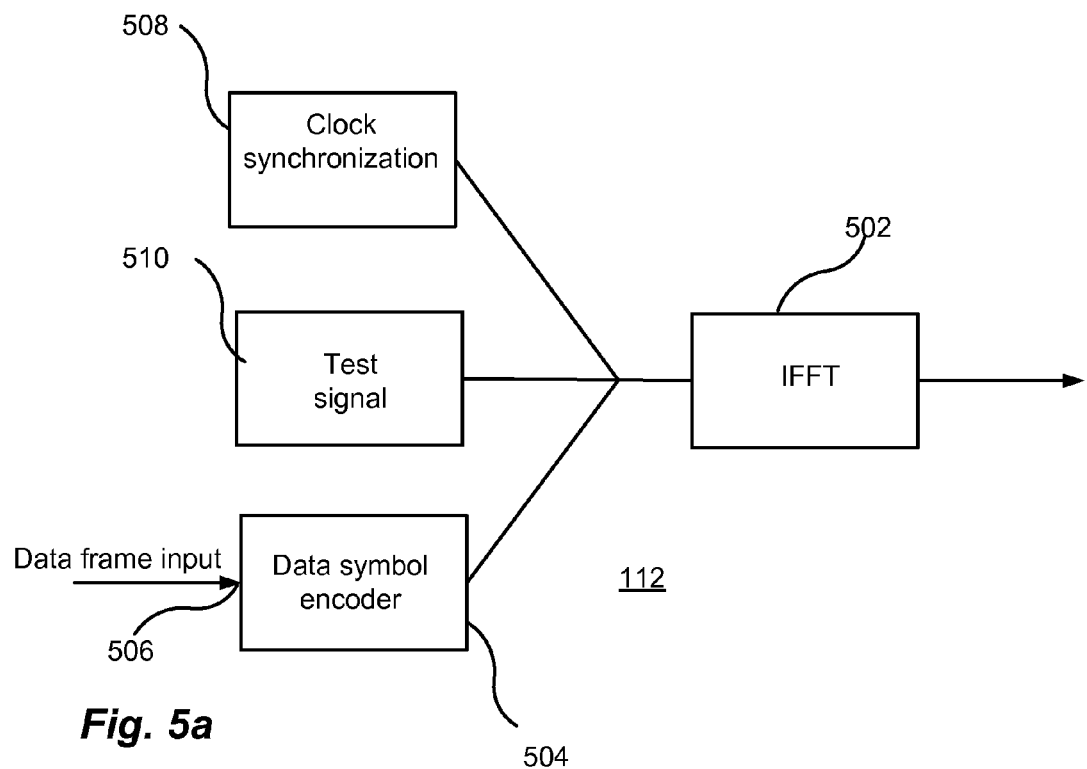
FIGS. 5a and 5b show block diagrams of exemplary transmitter entities.
Figure 5B:
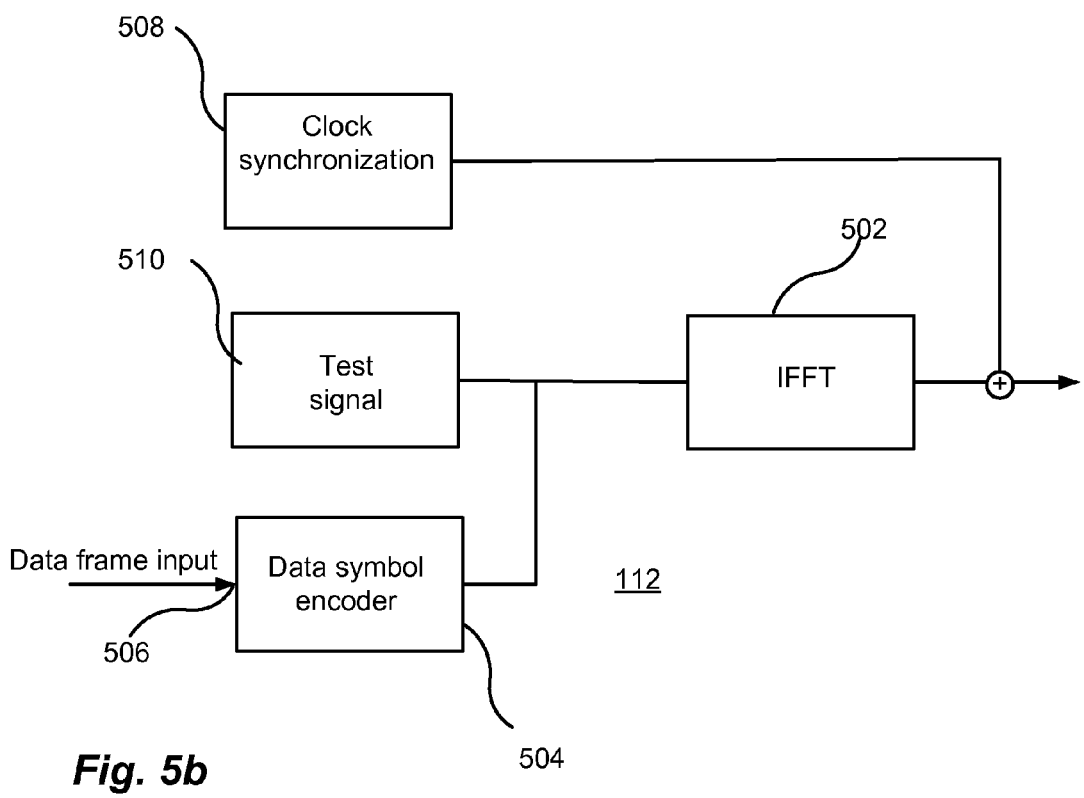

Referring now to FIGS. 5a and 5b, a block diagram of exemplary embodiments of a transmitter 112 implemented for generating and transmitting clock synchronization signals and test signals in accordance with the above described embodiments and operations will be explained. Transmitter 112 may be any of transmitter 112a and 112b shown in FIG. 1.

FIG. 5a shows transmitter 112 comprising a frequency-to-time conversion block 502 such as an IFFT (inverse fast Fourier transformation) block. A data symbol encoder block 504 is provided to encode user data received at a data frame input 506 onto subcarrier symbols based on constellation diagrams. Furthermore, a clock synchronization entity 508 is provided to modulate a pilot tone on one or more subcarriers (frequencies) to the frequency-to-time conversion block 502. A test signal entity 510 is further provided to provide test signals for modulation on one or more subcarriers to the frequency-to-time conversion block 502. Depending on the power-saving state described above, the data symbol encoder block 504 may be deactivated during the power-saving state such that no user data is modulated on the subcarriers and transmitted. Furthermore, each of the clock synchronization entity 508, the test signal entity 510 and the frequency-to-time conversion block 502 may be deactivated during the second time intervals in which no clock synchronizing signals are provided and activated during the first time intervals to generate and transmit the clock synchronization signals or the test signals. Other components such as D/A converters, line drivers etc. and components at higher OSI-levels which are not shown in FIG. 5a may be also deactivated during the second time intervals in order to reduce the power consumed during the power-saving state.

FIG. 5b shows one implementation wherein the clock synchronization block may generate the pilot tone with the pilot tone frequency by using a sinus generator or other periodic-waveform generator or oscillator. The pilot tone is added to the signal path after the frequency-to-time-conversion block 502. This allows deactivating the frequency-to-time-conversion block 502 in power-saving states such as for example described with respect to FIGS. 3a and 3b while still transmitting the pilot tone for clock synchronization.

Figure 6:
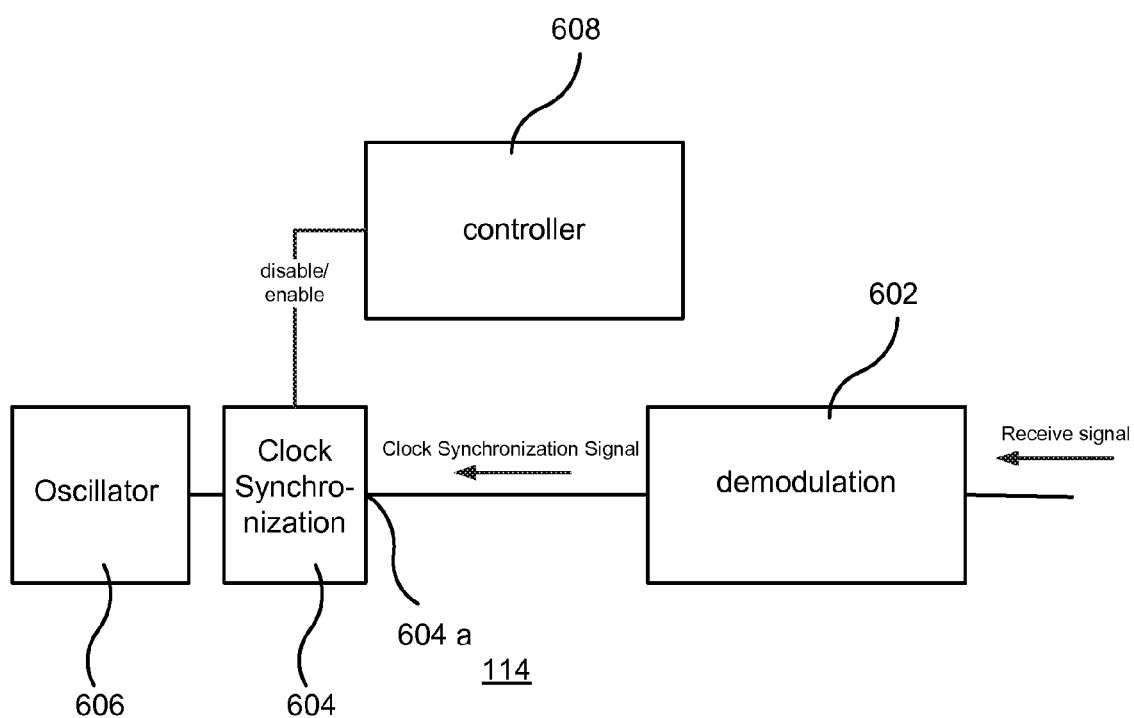
FIG. 6 shows a block diagram of an exemplary receiver entity.

FIG. 6 shows an exemplary receiver 114 such as receiver 114b wherein a slave clock is synchronized to a master clock by received intermittent synchronization signals.

Receiver 114 comprises a demodulation block 602 to demodulate and extract the clock signal from the received signal. Demodulation block 602 may comprise for example a time-to-frequency conversion such as a FFT (fast fourier transformation) or other demodulation techniques to extract the synchronization signal from the received signal.

The synchronization signals are then transferred to an input 604a of a clock synchronization entity 604 coupled to the demodulation block 602. Synchronization entity 604 is coupled to an oscillator 606 controlled by the synchronization block 604 to provide a clock signal synchronized to the synchronization signal. Oscillator 606 is for example a VCO (voltage controlled oscillator) or a DCO (digitally controlled oscillator). Oscillator 606 and synchronization entity 604 may for example be implemented in a PLL or DPLL (digital phase lock loop).

A controller 608 is coupled to the synchronization entity 604 to provide during the receiving of the synchronization signals in the first time intervals active control of the clock signal based on the received synchronization signal (activated synchronization control) for example by actively adjusting the phase delay of the clock signal based on the received synchronization signal. During time intervals when no synchronization signals are received, i.e. during the second time intervals, the synchronization entity receives information that the signal at its input 604a coupled to the demodulation block 602 is not to the interpreted as a synchronization signal. The synchronization entity will then maintain its state and provide controlling of the oscillator without being based on the signal at the synchronization signal input which is typically during the second time intervals a 0 V signal. In other words, during the second time intervals, the controlling of the oscillator by synchronization entity is logically decoupled and therefore independent from the signal at the synchronization signal input 604a. During the second time intervals, the oscillator will be controlled by the synchronization entity to maintain a constant or frozen phase delay. The oscillator may for example output the clock signal based on the regulated frequency of the oscillator before switching from controlled mode to the idle mode. The oscillator will be maintained in this controlling state until the next synchronization signal is received. By selecting the first and second time intervals appropriate, the oscillator will be able not to defer during the second time intervals in frequency or phase too much from the master clock and the clock signal can be easily adapted or synchronized with the next received synchronization signal.

It is to be noted that in other embodiments, a clock sampling rate conversion may be used to control the slave clock signal based on the master clock signal. In this case, the synchronization entity controls a filter used to adjust the output signal of the analog-to-digital converter to the estimated master clock. In a similar way, the synchronization entity controls the filter to adjust the digital transmit signal to the frequency of the estimated master clock. In this case, the oscillator is not directly controlled. The filter parameters may be updated during the first time intervals to provide control of the clock signal with parameters based on the synchronization signal input 604a. During the second time intervals, the filter parameters may be controlled by the synchronization entity to maintain a constant or frozen phase delay.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "entity", "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
setting a DSL transmitter in a power-saving state having a set spectral transmission power density;
transmitting, in the power-saving state, first signals from the DSL transmitter to a DSL receiver during first time intervals; and
transmitting, in the power-saving state, no signals from the DSL transmitter to the DSL receiver during second time intervals, which are between successive ones of the first time intervals.

2. The method according to claim 1, wherein the first signals comprise clock synchronization signals or signals for updating DSL operation parameters.

3. The method according to claim 1, wherein transmitting in the power-saving state first signals comprises repeatedly transmitting a pilot tone on at least one frequency from the DSL transmitter to the DSL receiver.

4. The method according to claim 1, further comprising updating at least one DSL operation parameter based on the first signals, wherein the at least one DSL operation parameter is at least one parameter of the group of parameters including a NEXT parameter, a FEXT parameter, an echo cancellation parameter, an equalizer setting parameter, a bit allocation parameter, an interleaver setting parameter, a noise protection parameter, a DSM Level 2 parameter, a gain parameter, a tone ordering parameter and a framing configuration parameter.

5. The method according to claim 1, wherein the first time intervals are shorter than the second time intervals.

6. The method according to claim 1, wherein the first time intervals are periodic in time.

7. The method according to claim 3, wherein the pilot tone is transmitted on a frequency different than a frequency of the pilot tone in a non-power-saving state.

8. The method according to claim 1, further comprising:
setting the DSL receiver in the power-saving state;
measuring the first signal by the DSL receiver in the power-saving state; and
updating at least one DSL operation parameter based on the measured first signal.

9. The method according to claim 1, wherein no user data is transmitted during the power-saving state from the DSL transmitter to the DSL receiver.

10. The method according to claim 1, further comprising:
transmitting operation and maintenance information in the power-saving state.

11. A device, comprising:
a controller to set a DSL receiver in a power-saving state having a set spectral transmission power density, wherein the controller is configured to identify in the power-saving state first time intervals during which first signals are received by the DSL receiver from a subscriber line and to identify in the power-saving state second time intervals, which are between successive ones of the first time intervals during which no signals are received by the DSL receiver from the subscriber line.

12. The device according to claim 11, wherein the first signals are clock synchronization signals, the device further comprising:
a synchronizing entity to synchronize a clock signal with the clock synchronization signals, wherein the synchronization entity comprises a synchronization signal input to receive the synchronization signals;
wherein the controller is configured to provide the synchronizing entity during the first time intervals in a first controlling state such that controlling of the clock signal is based on the signal received during the first time intervals at the synchronization signal input and to provide the synchronizing entity during the second time intervals in a second controlling state wherein the controlling of the clock signal is provided independent of the signal received during the second time interval at the synchronization signal input.

13. The device according to claim 12, wherein the controller is configured to transmit information related to the duration of the first time intervals or the duration of the second time intervals or the duration of the first and second time intervals over the subscriber line.

14. The device according to claim 11, wherein the first signals are test signals for updating at least one DSL operation parameter and wherein the device further comprises a measurement entity to measure the received test signals and to generate updating information related to at the least one DSL operation parameter based on the measured test signals.

15. The device according to claim 14, wherein the measurement entity is coupled to a transmitter to transmit the updating information over the subscriber line.

16. The device according to claim 11, wherein the controller is configured to identify whether a signal received in the power-saving state is a signal to be ignored by the device.

17. A system, comprising:
a first DSL transceiver;
a second DSL transceiver coupled to the first DSL transceiver via a subscriber line;
a first controller to set the first DSL transceiver in a first power-saving state having a set spectral transmission power density, wherein the controller is configured to control the first DSL transceiver to transmit in the first power-saving state first signals over a subscriber line during first time intervals and to transmit no signals on the subscriber line during second time intervals, which are between successive ones of the first time intervals;
a second controller to set the second DSL transceiver in a second power-saving state being equivalent to the first power-saving state, wherein the controller is configured to identify the first time intervals during which the first signals are transmitted by the first DSL transceiver over the subscriber line and to identify the second time intervals during which no signals are transmitted by the first DSL transceiver on the subscriber line.

18. The system according to claim 17, wherein the first transceiver comprises a first measurement entity to measure at least one of the first signals and/or the second transceiver comprises a second measurement entity to measure at least one of the first signals.

* * * * *